United States Patent Office 3,563,961
Patented Feb. 16, 1971

3,563,961
REACTIVE ALPHA OLEFIN POLYSULFONES
William S. Pickle, New Orleans, La., and Nicholas B. Lorette, Lake Jackson, Tex., assignors to The Dow Chemical Company, Midland, Mich., a corporation of Delaware
No Drawing. Filed Aug. 4, 1969, Ser. No. 847,425
Int. Cl. C08f 13/06
U.S. Cl. 260—78.5                                    5 Claims

ABSTRACT OF THE DISCLOSURE

Olefin polysulfones which are the reaction product of sulfur dioxide, at least one alpha olefin of from 4 to 40 carbon atoms and a monomer chosen from monoolefinically unsaturated carboxylic acid chlorides or monoolefinically unsaturated dicarboxylic anhydrides are useful to coat and protect various substrates. They are particularly useful to render natural fabrics shrink resistant and water repellant.

BACKGROUND OF INVENTION

This invention relates to alpha olefin polysulfones which are copolymers of sulfur dioxide, alpha olefins, and with other monoolefinically unsaturated carboxylic acid chloride and anhydride monomers.

The preparation of olefin polysulfones is well known in the art as is illustrated by the U.S. Pats. 2,136,389, 2,241,900 and 2,602,787. The patent to Brubaker et al., 2,241,900, is particularly pertinent to this invention since it discloses a copolymer of sulfur dioxide, alpha olefins and other substituted monoolefinically unsaturated compounds including methacrylic acid.

The present invention is superior to this prior art in that the present copolymers are more reactive and adhere to the surfaces of paper, metals, and fibers when cured.

SUMMARY OF INVENTION

It has now been found that copolymers of sulfur dioxide and alpha olefins with monoolefinically unsaturated carboxylic acid chlorides, monoolefinically unsaturated dicarboxylic acid anhydrides, or mixtures thereof can be prepared which are useful to coat paper, wood, concrete, stone, metals, and natural fibers, e.g., from a solvent solution thereof. These coatings when heat cured are insoluble in the solvents by which they were applied and thus are durable, weather resistant, and water resistant coatings.

The copolymers of this invention are particularly useful to coat natural fabrics such as wool and cotton to make them shrink resistant and water repellant since the treated fabrics substantially retain these properties through repeated washings with nonionic detergents.

DETAILED DESCRIPTION

The invention relates to olefin polysulfone copolymers which are the reaction product of sulfur dioxide, at least one alpha olefin of $C_4$–$C_{40}$ carbons and a member selected from (a) 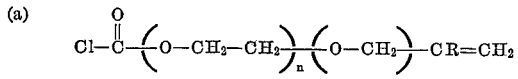

wherein
$n=0$–$3$
$m=0, 1$
$R=H, CH_3$ (b) 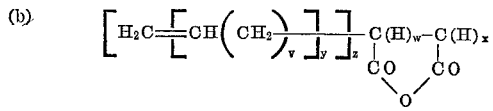

wherein
$y, z, w=0, 1$
$v=0$–$3$
$x=1, 2$ with the provisos that when $z$ is 0, then $w$ and $x$ are 1; when $z$ is 1 and $y$ is 0, then $w$ is 0 and $x$ is 2; and when $z$ is 1 and $y$ is 1, then $w$ is 1 and $x$ is 2, (c) mixtures of (a) and (b).

In the preparation of these olefin polysulfones, the above unsaturated chlorides, unsaturated anhydrides or mixtures thereof are used in an amount of not more than 50 mole percent. The mole percent of sulfur dioxide ranges from about 50 to 75. It is preferred to use a slight excess of $SO_2$ to avoid the necessity of removing large volumes of the gas from the polymer. The molecular weight of the olefin polysulfones ranges from about $1 \times 10^5$ to about $8 \times 10^5$ as determined by gel permeation chromatography in tetrahydrofuran. The final product contains an olefin-sulfur dioxide ratio of 1:1.

In general, the olefin polysulfones are prepared by saturating an inert solvent with sulfur dioxide gas, adding one of the olefinic monomers, adding a catalyst solution and adding the other olefinic monomers. The addition of sulfur dioxide is continued throughout the reaction. If desired, the catalyst solution can be mixed in with the olefinic monomers and added with them.

The inert solvents that can be used for the reaction are of three general types, i.e., hydrocarbons, halogenated hydrocarbons and glycol ethers. Examples of the first group are benzene, n-hexane, diethyl benzene, naphtha, kerosene. Examples of the second group are perchloroethylene, methylene chloride, trichlorobenzene, carbon tetrachloride, 1,1,1-trichloroethane and the like. Examples of the third group are diethylene glycol dimethyl ether, diethylene glycol ether, diethylene glycol di-n-butyl ether, ethylene glycol dimethyl ether, dipropylene glycol dimethyl ether and the like. The advantage of using the first two groups of solvents is that the formed olefin polysulfone remains in solution whereas with the third group, it precipitates out and must be redissolved in solvents of the first or second group for its subsequent coating application.

The catalysts which can be used in this process are of the ionic type and the peroxide type. Examples of the first group are silver nitrate, lithium nitrate, ammonium nitrate and the like. Examples of the second group are t-butyl peroxypivalate, methyl ethyl ketone peroxide, acetyl peroxide, t-butyl peracetate and the like.

The temperature of the reaction is not critical and can range from about −30° to about 50° C. The preferred range is from 10° to 30° C.

The pressure used for this reaction can range from about 1 to 300 pounds per square inch (gauge) with the preferred pressure being the autogenous pressure developed during the reaction conditions employed.

The monomers used to make the copolymers of this invention, in addition to the sulfur dioxide, include alpha olefins of 4–40 carbon atoms. These olefins are commercially available as pure or mixed monomers from petroleum cracking processes or from the polymerization of ethylene to a low degree. A preferred range of carbon atoms for these alpha olefins is from 6 to 20 carbon atoms. The olefins used can be the pure olefin or a mixture of olefins. It is preferred to use a mixture of alpha olefins since they are readily available and less expensive than the pure monomers.

The unsaturated carboxylic acid chlorides that can be used are exemplified by 3-butenyl chloroformate, allyl chloroformate, acrylyl chloride, methallyl chloroformate, methacrylyl chloride, 3-butenyloxy ethyl chloroformate, 3-isopentenyloxyethyl chloroformate, 3-butenyloxyethoxyethyl chloroformate and the like. The foregoing chloroformates (chlorocarbonates) are either commercially available or readily prepared by adding the corresponding unsaturated alcohol to an excess of phosgene condensed in a flask at 0° C., stirring, and distilling.

The unsaturated dicarboxylic anhydrides that can be used are exemplified by maleic anhydride, itaconic anhydride, vinyl succinic anhydride, 2-propenyl succinic anhydride, 3-butenyl succinic anhydride and 4-pentenyl succinic anhydride.

It is also within the scope of this invention to prepare copolymers from sulfur dioxide, at least one alpha olefin, and a mixture of one of the above unsaturated carboxylic chlorides with one of the above unsaturated dicarboxylic anhydrides. Examples of these mixtures are allyl chloroformate and maleic anhydride, acrylyl chloride and itaconic anhydride, maleic anhydride and 3-butenyl chloroformate, and similar combinations.

The following examples are presented solely to illustrate the invention claimed hereinafter.

EXAMPLE 1

A one liter round bottom flask was equipped with an air driven glass Teflon paddle stirrer equipped to run at about 250 revoltuions per minute; a $SO_2$ gas source metered by a flowmeter into the flask through a demister; and a Dry Ic-acetone condenser. Benzene (375 ml.) was placed in the flask and $SO_2$ gas passed into the benzene (at 20° C.) at a rate of 52.08 g./hr. for 1 hour 40 minutes to saturate the benzene. Then the $SO_2$ addition rate was cut to 2.8 g./hr. A mixture of 125 milliliters (88.8 g.) 0.791 mole of an α-olefin mixture of $C_6$, $C_8$, and $C_{10}$ carbons and 84 milliliters (94.8 g.) 0.791 mole of allyl chloroformate was added immediately followed by 0.50 cc. of a 75 percent by weight solution of t-butyl peroxypivalate in mineral spirits. The mixture was stirred and the polymerization was run for the first eight hours with the flask at about 20° C. (ambient temperature) and the $SO_2$ refluxing via the Dry Ice-acetone condenser. The gas was continually added at 2.8 g./hr.

The polymer was then dried under vacuum to a colorless, transparent, glossy, hard, very brittle polymer with extremely good glass adhesion and extremely fast solubility in benzene. The benzene solution can be diluted with perchloroethylene. The yield was 184 grams (45.1 percent by weight of theoretical, assuming one mole of unsaturation in the unsaturated monomers polymerizes with one mole of $SO_2$) of a polymer containing 4.90 percent by weight allyl chloroformate. The original benzene reaction mixture was smooth, viscous, completely transparent and colorless and, when absorbed on paper, formed, formed a dry film on the surface that was quite flexible and had a faint gloss. The area so treated was completely nonwettable. Water immediately ran to untreated portions of the paper. The paper did not lose gexibility and seemed to gain some.

EXAMPLE 2

A two-liter resin kettle was equipped with an air-driven glass Teflon paddle stirrer (300 r.p.m.); a water cooled condenser; a graduated dropping funnel; and an $SO_2$ gas source metered through a flowmeter into the kettle through a demister. Inside was placed 1000 milliliters of diethylene glycol dimethyl ether through which was passed $SO_2$ gas at a rate of (52.08 g./hr.) for 5 hours 40 minutes. Then, 250 milliliters (196.8 g.) of an α-olefin mixture of $C_{16}$, $C_{18}$, $C_{20}$ carbons was added. After 2 hours, 5 cc. of a 75 percent by weight solution of t-butyl peroxy pivalate in mineral spirits was added to the reactor. Then a solution of 100 g. of maleic anhydride in 100 milliliters of diethylene glycol dimethyl ether was added dropwise to the reaction mixture over a 30 hour period. The $SO_2$ addition and stirring were continued over a 43 hour 40 minute period. The polymer precipitated from solution during polymerization. The solvent was removed, the polymer washed three times with acetone and vacuum dried. The yield was 160.92 grams (39.4 percent of theory) of a polymer containing 1.1 percent weight maleic anhydride. The polymer is clear, colorless, and waxy in appearance. It aheres well to surfaces of stone, wood, glass, steel and paper and is soluble in benzene or chlorinated solvents.

EXAMPLE 3

To the apparatus arranged as in Example 2 was added 1000 milliliters diethylene glycol dimethyl ether into which $SO_2$ gas was passed at 22.5° C. at a rate of 52.08 g./hr. After 6.0 hours, 225 milliters (254 g.) of allyl chloroformate were added followed 24 minutes later by 5.00 milliliters of a 75 percent by weight solution of t-butyl peroxypivalate in mineral spirits. After 13 minutes, dropwise addition of a mixture of 250 milliliters (197 g.) of the same alpha olefin used in Example 2, 25 grams maleic anhydride, and 40 milliliters diethylene glycol dimethyl ether was started and continued until the mixture was exhausted. Addition of $SO_2$ continued at the above rate over a 112.5 hour period. The product was then washed three times with acetone and vacuum dried. There was obtained 170 grams (yield: 26.3 percent) of a polymer containing 5.6 percent weight allyl chloroformate and 4.2 percent maleic anhydride.

EXAMPLES 4–16

The Examples 4–13 of Table I were run according to the procedure of Example 2. Examples 14–16 were run according to the procedure of Example 3.

TABLE I

| | Weight percent reactant monomer | | Composition of polymer | | | | |
|---|---|---|---|---|---|---|---|
| | ACF* | MA** | Percent $SO_2$ | Percent ACF* | Percent MA** | Grams product | Percent yield |
| Example: | | | | | | | |
| 4 | 5 | 0 | N.A. | 0.20 | 0 | N.A. | N.A. |
| 5 | 15 | 0 | 17.6 | 0.25 | 0 | 140 | 43.6 |
| 6 | 30 | 0 | 17.9 | 0.70 | 0 | 170 | 30.2 |
| 7 | 30 | 0 | 18.4 | 0.60 | 0 | 138 | 41 |
| 8 | 50 | 0 | 19.5 | 2.90 | 0 | 79.2 | 22.9 |
| 9 | 59 | 0 | 19.0 | 5.00 | 0 | 174.7 | 25.8 |
| 10 | 59 | 0 | N.A. | 3.8 | 0 | 187.7 | 27.7 |
| 11 | 59 | 0 | N.A. | 3.6 | 0 | 162.5 | 24.0 |
| 12 | 59 | 0 | N.A. | 3.2 | 0 | 172.2 | 25.5 |
| 13 | 0 | 33.7 | 18.1 | 0 | 1.0 | 152.9 | 37.5 |
| 14 | 25.5 | 15.1 | N.A. | 0.8 | 2 | 202.2 | 47.8 |
| 15 | 36.3 | 21.5 | N.A. | 5.6 | 4.2 | 192.5 | 28.8 |
| 16 | 36.3 | 21.5 | N.A. | 2.4 | 2.6 | 195.5 | 29.3 |

*Allyl chloroformate.
**Maleic anhydride.
NOTE.—N.A.=No analysis.

EXAMPLES 17-20

The examples in Table II were run according to the procedure of Example 1.

TABLE II

| Example: | Weight percent ACF monomer | Percent ACF in polymer | Grams product | Percent yield |
|---|---|---|---|---|
| 17 | 30 | 2.90 | 101.2 | 38.2 |
| 18 | 51.6 | 4.2 | 183.6 | 45.1 |
| 19 | 51.6 | 3.3 | 391.2 | N.A. |
| 20 | 51.6 | 3.6 | 199.7 | 24.5 |

NOTE.—N.A.=No analysis.

The data in Table III shows the molecular weights of the polymers in some of the above examples. The molecular weights were determined by gel permeation chromatography of the polymer in tetrahydrofuran.

TABLE III

| Example No.: | Mol. wt. |
|---|---|
| 2 | 270,000 |
| 3 | 464,000 |
| 13 | 270,000 |
| 14 | 646,000 |
| 15 | 204,000 |
| 16 | 171,000 |
| 17 | 286,000 |
| 18 | 383,000 |
| 19 | 281,000 |
| 20 | 264,000 |

EXAMPLE 21

To 1000 milliliters perchloroethylene saturated with $SO_2$ at 23° C. was added 250 milliliters (1.58 moles or 178 grams) of the α-olefin of Example 1 and 250 milliliters allyl chloroformate (2.35 moles or 283 grams). To this was added 1.00 cc. of a 75 percent by weight solution of t-butyl peroxypivalate in mineral spirits. The reaction was run at room temperature for 69 hours. The colorless product weighed 163 grams and contained 6.5 percent allyl chloroformate.

EXAMPLE 22

Example 21 was repeated using benzene as the solvent. A product containing 5.0 percent weight allyl chloroformate and weighing 145.8 grams was obtained.

EXAMPLE 23

To 350 milliliters perchloroethylene saturated with $SO_2$ at room temperature was added 125 milliliters of the α-olefin of Example 1 and 84 milliliters acrylyl chloride (uninhibited). To this was added 1.00 cc. of a 75 percent by weight solution of t-butyl peroxypivalate in mineral spirits. The reactor was kept saturated at atmospheric pressure for 120 hours. The $SO_2$ was blown out with nitrogen gas and the polymer was air dried. The yield was 55.5 grams of a colorless glossy polymer soluble in benzene, acetone and methylene chloride. The acid chloride content of the polymer was greater than 10 percent by weight. Both olefin and $SO_2$ were incorporated in the polymer.

Attempts to use benzene or heptane with acrylyl chloride gave polymers with very poor color.

EXAMPLE 24

The polymer prepared in Example 9 was deposited on a wool flannel swatch 6" x 6" from a kerosene solvent containing about 10 weight percent polymer. The wool was cured at 132° C. for five minutes and it retained its normal color and hand. The dry wool contained 9 weight percent polymer. The wool swatch was then subjected to a series of washing tests in a laboratory washer (Tergotometer) at 100 r.p.m. and tested for shrinkage at the end of each cycle as follows:

| Duration, min. | Solvent* | Percent area shrinkage at end of indicated time |
|---|---|---|
| Cycle No.: | | |
| 1 ........ 60 | Water | 0.9 |
| 2 ........ 60 | ____do____ | 3.3 |
| 3 ........ 60 | ____do____ | 0.6 |
| 4 ........ 30 | Perchloro-ethylene | 1.6 |
| 5 ........ 60 | Water | **(+)3.2 |
| Net shrinkage | | 3.2 |

*Contained 0.1 wt. percent of a surfactant. Dowfax 9N9 (a nonylphenol-ethylene oxide condensate having 9 to 10 moles of ethylene oxide).
**Expansion.

Untreated samples of wool shrank 40–45 percent in area in the same test scheme. If the polymer was not chemically attached to the wool, the perchloroethylene wash would have removed it. The treated sample had substantially the same water repellency after the test procedure as before it with much less shrinkage compared to the controls.

What is claimed is:

1. An olefin polysulfone copolymer comprising the reaction product of $SO_2$, at least one α-olefin of from 4–40 carbon atoms and a member selected from the group consisting of:

(a)

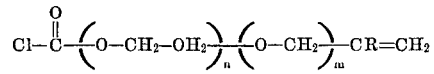

wherein
$n = 0$–$3$
$m = 0, 1$
$R = H, CH_3$ (b)

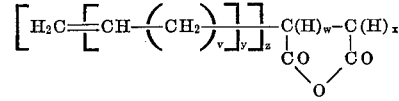

wherein
$y, z, w = 0, 1$
$v = 0$–$3$
$x = 1, 2$ with the provisos that when $z$ is 0, then $w$ and $x$ are 1; when $z$ is 1 and $y$ is 0, then $w$ is 0 and $x$ is 2; and when $z$ is 1 and $y$ is 1, then $w$ is 1 and $x$ is 2, (c) mixtures of (a) and (b).

2. The copolymer of claim 1 wherein the member is allyl chloroformate.

3. The copolymer of claim 1 wherein the member is acrylyl chloride.

4. The copolymer of claim 1 wherein the member is maleic anhydride.

5. The copolymer of claim 1 wherein the member is a mixture of allyl chloroformate and maleic anhydride.

References Cited

UNITED STATES PATENTS

| 2,241,900 | 5/1941 | Brubaker et al. | 260—80 |
| 2,253,775 | 8/1941 | Frey et al. | 260—80 |

JOSEPH L. SCHOFER, Primary Examiner

J. KIGHT III, Assistant Examiner

U.S. Cl. X.R.

260—79.3; 117—161

PO-1050
(5/69)

UNITED STATES PATENT OFFICE
CERTIFICATE OF CORRECTION

Patent No. 3,563,961                    Dated  16 February 1971

Inventor(s)    Eilliam S. Pickle and Nicholaw B. Lorette

It is certified that error appears in the above-identified patent and that said Letters Patent are hereby corrected as shown below:

In column 1, line 66, change "$(O-CH_2)$" to -- $(O-CH_2)_m$ --.

In column 2, line 41, insert -- diethyl -- between "glycol" and "et:

In column 3, line 30, change "revoltuions" to -- revolutions --; in line 32 change "Ic-" to -- Ice --.

In column 4, line 1, delete the first workd "formed,"; at line 38 change "milliters" to -- milliliters --; in Table I at the bottom of the column change the 5th figure under column headed Percent $SO_2$ from "19.5" to -- 19.4 --.

In column 6, line 32 change "$(O-CH_2-OH_2)$" to -- $(O-CH_2-CH_2)$ -- :

Signed and sealed this 12th day of October, 1971.

(SEAL)
Attest:

EDWARD M. FLETCHER, JR.          ROBERT GOTTSCHALK
Attesting Officer                 Acting Commissioner of Pater